(12) United States Patent  (10) Patent No.: US 8,838,612 B2
Berlener et al.  (45) Date of Patent: Sep. 16, 2014

(54) METHODS AND SYSTEMS FOR IMPLEMENTING FULFILLMENT MANAGEMENT

(75) Inventors: Kara Lea Berlener, Highlands Ranch, CO (US); Karen Lee Brown, Centennial, CO (US); Eric Vance, Denver, CO (US); Denise Tsuru Okuno-Prickett, Littleton, CO (US); Jack William Hurdelbrink, Thornton, CO (US); Joseph Ellimoottil Joseph, Bangalore (IN); Yelena B. Feldman, Denver, CO (US); Thomas Gerard Vinci, Englewood, CO (US); Paula Dennice Dietz, Castle Rock, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/213,411

(22) Filed: Aug. 19, 2011

(65) Prior Publication Data

US 2012/0072431 A1  Mar. 22, 2012

Related U.S. Application Data

(60) Provisional application No. 61/383,724, filed on Sep. 16, 2010.

(51) Int. Cl.
  *G06F 7/00* (2006.01)
  *G06F 17/30* (2006.01)
  *G06Q 10/08* (2012.01)
  *G06Q 30/06* (2012.01)

(52) U.S. Cl.
  CPC .............. *G06Q 30/06* (2013.01); *G06Q 10/087* (2013.01)
  USPC ...................................... 707/748; 705/26.81

(58) Field of Classification Search
  None
  See application file for complete search history.

(56) References Cited

U.S. PATENT DOCUMENTS 5,758,329 A * 5/1998 Wojcik et al. .................. 705/28
6,516,301 B1 * 2/2003 Aykin .......................... 705/7.25
6,587,827 B1 * 7/2003 Hennig et al. .............. 705/26.1

(Continued)

FOREIGN PATENT DOCUMENTS

WO    WO 0237234 A2 *  5/2002
WO    WO 03075195 A2 *  9/2003

OTHER PUBLICATIONS

Integrating the warehousing and transportation functions of the supply chain, Mason et al., Transportation Research Part E 39, pp. 141-159, 2003.*

(Continued)

*Primary Examiner* — Augustine K Obisesan
(74) *Attorney, Agent, or Firm* — Kilpatrick Townsend & Stockton LLP

(57) ABSTRACT

Embodiments of the invention include a method of implementing fulfillment management. The method includes receiving order information, wherein the order information includes one or more order lines, selecting at least one of the one or more order lines, scoring the one or more selected order lines, and accessing one or more rules assigned to the one or more order lines. The method further includes based on the assigned rules, defining a priority rank of each of the one or more selected order lines, specifying fulfillment of inventory based on the priority and scoring of each of the selected one or more order lines, and assigning inventory based on the specified fulfillment.

11 Claims, 17 Drawing Sheets

(56) References Cited

U.S. PATENT DOCUMENTS

| | | | |
|---|---|---|---|
| 7,069,235 B1* | 6/2006 | Postelnik et al. | 705/26.81 |
| 2001/0042040 A1* | 11/2001 | Keith | 705/37 |
| 2002/0013731 A1* | 1/2002 | Bright et al. | 705/22 |
| 2002/0103690 A1* | 8/2002 | Lyon et al. | 705/9 |
| 2002/0156716 A1* | 10/2002 | Adatia | 705/37 |
| 2002/0161674 A1* | 10/2002 | Scheer | 705/28 |
| 2002/0188486 A1* | 12/2002 | Gil et al. | 705/7 |
| 2002/0188499 A1* | 12/2002 | Jenkins et al. | 705/10 |
| 2003/0033205 A1* | 2/2003 | Nowers et al. | 705/26 |
| 2003/0074270 A1* | 4/2003 | Brown et al. | 705/26 |
| 2003/0110104 A1* | 6/2003 | King et al. | 705/28 |
| 2003/0130863 A1* | 7/2003 | Grey et al. | 705/1 |
| 2003/0171962 A1* | 9/2003 | Hirth et al. | 705/7 |
| 2003/0172007 A1* | 9/2003 | Helmolt et al. | 705/28 |
| 2003/0177086 A1* | 9/2003 | Gomber et al. | 705/37 |
| 2004/0006516 A1* | 1/2004 | Anagol-Subbarao et al. | 705/26 |
| 2004/0107151 A1* | 6/2004 | Bruns | 705/29 |
| 2004/0193510 A1* | 9/2004 | Catahan et al. | 705/28 |
| 2004/0210621 A1* | 10/2004 | Antonellis | 709/200 |
| 2004/0225636 A1* | 11/2004 | Heinzel et al. | 707/1 |
| 2005/0055283 A1* | 3/2005 | Zarovinsky | 705/26 |
| 2005/0075955 A1* | 4/2005 | Milovina-Meyer et al. | 705/30 |
| 2006/0015455 A1* | 1/2006 | Hahn-Carlson et al. | 705/39 |
| 2006/0036548 A1* | 2/2006 | Roever et al. | 705/51 |
| 2006/0059107 A1* | 3/2006 | Elmore et al. | 705/64 |
| 2006/0190348 A1 | 8/2006 | Ofer et al. | |
| 2006/0206235 A1* | 9/2006 | Shakes et al. | 700/216 |
| 2007/0050069 A1* | 3/2007 | Treichler et al. | 700/99 |
| 2007/0174144 A1* | 7/2007 | Borders et al. | 705/27 |
| 2008/0015943 A1* | 1/2008 | Kahlon et al. | 705/22 |
| 2008/0040233 A1* | 2/2008 | Wildman et al. | 705/26 |
| 2008/0114712 A1* | 5/2008 | Gleim et al. | 706/47 |
| 2008/0154709 A1* | 6/2008 | Ham et al. | 705/10 |
| 2008/0154750 A1* | 6/2008 | Hegemier et al. | 705/28 |
| 2008/0228600 A1 | 9/2008 | Treyz et al. | |
| 2008/0270313 A1* | 10/2008 | Cullen et al. | 705/80 |
| 2009/0043689 A1* | 2/2009 | Yang et al. | 705/38 |
| 2009/0112675 A1* | 4/2009 | Servais | 705/8 |
| 2009/0240544 A1* | 9/2009 | Cheng et al. | 705/8 |
| 2009/0271280 A1* | 10/2009 | Malone | 705/26 |
| 2009/0276365 A1* | 11/2009 | Wilson | 705/36 R |
| 2009/0307096 A1* | 12/2009 | Antonellis | 705/15 |
| 2010/0125486 A1* | 5/2010 | Sinclair et al. | 705/10 |
| 2010/0191558 A1* | 7/2010 | Chickering et al. | 705/7 |

OTHER PUBLICATIONS

International Search Report and Written Opinion of PCT/US11/51732 mailed on Apr. 5, 2012, 7 pages.

Author Unknown, "Order Entry and Order Management Software: BusinessFlow's Engine," Mainstreet Commerce, [online], 2005, [retrieved on Mar. 16, 2011], 3 pages. Retrieved from: http://www.mainstreetcommerce.com/solutions/ordermanagement.aspx.

Author Unknown, "Sales Order Processing," Microsoft Corporation, 2005, 4 pages.

Author Unknown, "SAP White Paper—Order Fulfillment," SAP AG, 2009, 12 pages.

Author Unknown, "SocrateOpen Warehouse Management," BIT Software, no date, 2 pages.

Bathula, R., "SNP:CTM—Concepts, Demand Prioritization and Supply Categorization," SAP AG, 2008, 14 pages.

* cited by examiner

Figure 4C

| Order Type | Line Type | Customer Priority | Requested Date Age | Custom Function Priority | Score |
|---|---|---|---|---|---|
| SO | N | 10.000 | 1 | 0.000 | 50 |
| SO | N | 5.000 | 1 | 0.000 | 75 |
| SO | N | 1.000 | 1 | 0.000 | 85 |
| SO | S | 10.000 | 5 | 0.000 | 75 |
| SO | S | 10.000 | 1 | 0.000 | 80 |
| SO | S | 10.000 | -99999 | 0.000 | 100 |
| SO | S | 5.000 | 5 | 0.000 | 75 |
| SO | S | 5.000 | 1 | 0.000 | 90 |
| SO | S | 5.000 | -99999 | 0.000 | 125 |
| SO | S | 1.000 | 5 | 0.000 | 90 |
| SO | S | 1.000 | 1 | 0.000 | 100 |
| SO | S | 1.000 | -99999 | 0.000 | 150 |
| SR | S | 10.000 | -99999 | 0.000 | 90 |
| SR | S | 5.000 | -99999 | 0.000 | 110 |
| SR | S | 1.000 | -99999 | 0.000 | 120 |

Figure 5B

Processing Options

OK  Cancel
✓   ✗

Process

| | |
|---|---|
| 1. Scoring Method | 1 |

Blank = Basic
1 = Advanced

| | |
|---|---|
| 2. Weight Factor for Order Type Priority Preference | 25.00 |
| 3. Weight Factor for Line Type Priority Preference | 25.00 |
| 4. Weight Factor for Customer Sold To Priority | 25.00 |
| 5. Weight Factor for Requested Date Priority Preference | 25.00 |
| 6. Weight Factor for Custom Priority | |
| 7. Custom Priority Calculation Function | |
| 8. Override Advanced Preference Schedule | ADVPREF |
| 9. Set warning when basic score is not found | |

Blank = Do not set warning
1 = Set warning

Figure 5C

| Order Number | Line Number | Order Type Priority | Order Type Priority Weight | Line Type Priority | Line Type Priority Weight | Requested Date Priority | Requested Date Priority Weight | Customer Priority | Customer Priority Weight | Custom Function Priority | Custom Function Priority Weight |
|---|---|---|---|---|---|---|---|---|---|---|---|
| 12637 | 1.000 | 100 | 5.00% | 100 | 10.00% | 150 | 50.00% | 100 | 35.00% | 0 | 0.00% |
| 12637 | 2.000 | 100 | 5.00% | 110 | 10.00% | 150 | 50.00% | 100 | 35.00% | 0 | 0.00% |
| 12638 | 1.000 | 100 | 5.00% | 100 | 10.00% | 100 | 50.00% | 100 | 35.00% | 0 | 0.00% |
| 12638 | 2.000 | 100 | 5.00% | 110 | 10.00% | 100 | 50.00% | 100 | 35.00% | 0 | 0.00% |

| Order Number | Line Number | Order Type Segment Total | Line Type Segment Total | Requested Date Segment Total | Customer Segment Total | Custom Function Segment Total | Total Score (Sum of Segment Totals) |
|---|---|---|---|---|---|---|---|
| 12637 | 1.000 | 5 | 10 | 75 | 35 | 0 | 125 |
| 12637 | 2.000 | 5 | 11 | 75 | 35 | 0 | 126 |
| 12638 | 1.000 | 5 | 10 | 50 | 35 | 0 | 100 |
| 12638 | 2.000 | 5 | 11 | 50 | 35 | 0 | 101 |

Figure 5D

Processing Options

OK  Cancel

Process  Versions

1. Proof or Final Mode.
Blank = Run Auto Fulfillment in Proof Mode.
1 = Run Auto Fulfillment in Final Mode 2. Fulfillment Plan Description.                                6-17

3. Include Backordered Quantity as Available Quantity.
Blank = Do not add backordered quantity to available quantity
1 = Add backorder quantity to available quantity 4. Release the fulfillment after orders are fulfilled.
Blank = Do not run Release from Fulfillment UBE
1 = Run Release from Fulfillment UBE 5. Fulfillment Rule Name.                                       BETADEMORULE 6. Reprocess Fulfillment
Blank = The system does not reprocess the fulfillment
1 = The system does reprocess the fulfillment 7. Record Reservation
Blank = Set record reservation error and continue looking for additional reservations
1 = Stop processing the UBE when the first record reservation error occurs 8. Override Advanced Preference

Figure 5E

METHODS AND SYSTEMS FOR IMPLEMENTING FULFILLMENT MANAGEMENT

PRIORITY CLAIM

This application claims priority to U.S. Provisional Application No. 61/383,724, entitled FULFILLMENT MANAGEMENT, filed on Sep. 16, 2010, which is incorporated by reference in its entirety for any and all purposes.

BACKGROUND

Generally, fulfillment management systems simply use a first in first out (FIFO) queuing scheme. In other words, there is no weight placed on any of the attributes of the order, but instead the oldest orders are filled first until current inventory is diminished. This can cause significant problems because generally manufacturers and suppliers do not have enough supply to meet demand. Therefore, under the FIFO schema, unfilled or partially filled orders may remain unfulfilled for a long period of time, which causes a loss of business, customers, and revenue. Hence, improvements are needed in the art.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A-4C illustrate aspects of fulfillment management, in accordance with various embodiments of the invention.

FIGS. 5A-5E are user interfaces and charts illustrating aspects of fulfillment management, in accordance with various embodiments of the invention.

SUMMARY OF THE INVENTION

Figure 1A:
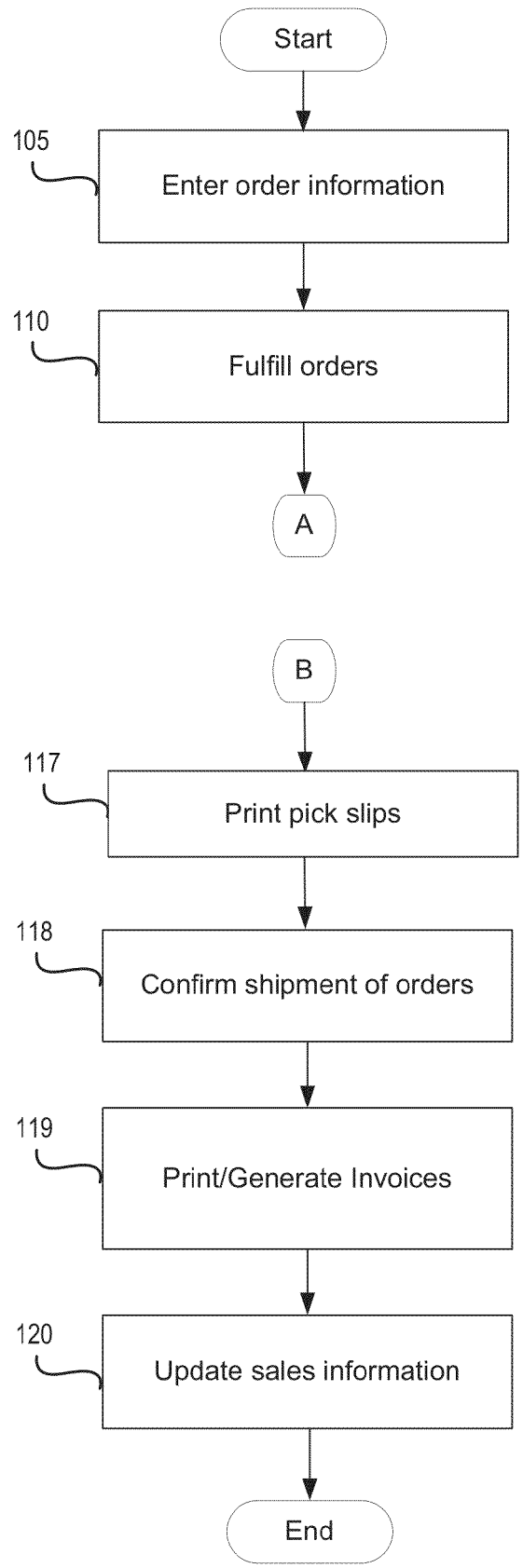
FIGS. 1A-1C are flow diagrams illustrating methods of implementing fulfillment management, in accordance with various embodiments of the invention.

One embodiment of the present invention described a method of implementing fulfillment management. The method includes receiving order information, wherein the order information includes one or more order lines, selecting at least one of the one or more order lines, scoring the one or more selected order lines, and accessing one or more rules assigned to the one or more order lines. The method further includes based on the assigned rules, defining a priority rank of each of the one or more selected order lines, specifying fulfillment of inventory based on the priority and scoring of each of the selected one or more order lines, and assigning inventory based on the specified fulfillment.

Furthermore, the method includes determining that at least one of the one or more order lines includes bypass order content, and in response to the at least one of the one or more order lines including bypass content, directly assigning inventory for the at least one of the one or more order lines. Further, the bypass order content includes one or more of: manufactured-to-order, configured to order, non-stock item, or direct ship order, and the scoring comprises weighting order line attributes. Further, the order line attributes include one or more of order type, line type, requested date age, or customer priority.

Furthermore, the defining of the priority rank of each of the order lines includes providing weighting of the order line attributes. The method further includes accessing service level rules, which include partial quantity agreements, minimum quantity thresholds, order line fill percentages, and minimum release amounts. The method further includes providing a user interface for providing review of the assigned inventory. The user interface at least includes quantity assignments for each of the order lines. Also, the selecting of the at least one of the one or more order lines comprises checking each of the order lines against preferences to determine which of the order lines correspond to the preferences.

In a further embodiment, a system for implementing fulfillment management, is described. The system includes a fulfillment management server which includes a memory device, and a processor in communication with the memory device. The memory device has sets of instructions stored thereon which, when executed by the processor, cause the processor to: receive order information. The order information includes one or more order lines. The instructions further cause the processor to: select at least one of the one or more order lines, score the one or more selected order lines, access one or more rules assigned to the one or more order lines, and based on the assigned rules, define a priority rank of each of the one or more selected order lines. Further cause the process to: specify fulfillment of inventory based on the priority and scoring of each of the selected one or more order lines, and assign inventory based on the specified fulfillment.

The system further includes an order intake server in communication with the fulfillment management server. The order intake server is configured to receive the order information, and the order information is received from one or more of: SO entry, CSR SO entry, CSS, blanket orders, recurring orders, demand scheduling execution (DSE), electronic data interchange (EDI), or transfer orders.

In another embodiment, a computer-readable medium, is described. The computer-readable medium includes instructions for receive order information. The order information includes one or more order lines. The computer-readable medium further includes instructions for selecting at least one of the one or more order lines, scoring the one or more selected order lines, accessing one or more rules assigned to the one or more order lines, based on the assigned rules, defining a priority rank of each of the one or more selected order lines. Furthermore, the computer-readable medium includes specifying fulfillment of inventory based on the priority and scoring of each of the selected one or more order lines, and assigning inventory based on the specified fulfillment.

Furthermore, the computer-readable medium includes instructions for determining that at least one of the one or more order lines includes bypass order content, and in response to the at least one of the one or more order lines including bypass content, directly assigning inventory for the at least one of the one or more order lines. The bypass order content includes one or more of: manufactured-to-order, configured to order, non-stock item, or direct ship order. Further, the scoring includes weighting order line attributes, and the order line attributes include one or more of order type, line type, requested date age, or customer priority.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the present invention relate to fulfillment management; for example, managing supply by prioritizing sales orders lines, assigning inventory based on priority and service level rules, assigning partial quantities based on customer and customer preferences, canceling open balance quantities, etc. Such supply management techniques provide improved customer service by improving order and line fill rates for priority customers, enforcing targeted service levels, reducing late orders for priority customers, reducing backorders and lost sales, tracking reasons for overriding standard service level rules, etc. Additionally, a decrease in administrative costs can be achieved by enforcing fill rates automatically, reducing costly penalty fees and fines, canceling open balances automatically based on rules, reducing transportation costs by enforcing number of releases (e.g., shipments), etc.

Furthermore, the present invention enhances the fulfillment process to enable customers to determine how to fulfill (or assign) inventory to sales orders. The fulfillment management includes, for example, selecting of orders that are to enter the process, scoring the orders, fulfilling inventory to the orders, reviewing the fulfillments, and releasing the order back to the standard sales process. The selection process includes the ability to not have all orders or items enter the process, monitoring of the fulfillment of standard order quantities for specific items, and controlling of demand by not always fulfilling 100% of all orders. Scoring and assigning rules provides that during order entry scoring and assignment of rules can be completed interactively. Alternatively, this can be done using batch programs to reduce the performance impact during order entry.

Specifically, scoring uses information from the order and the customer to score order lines (e.g., customer priority, order type, line type, requested date age, etc.). Assignment of service level agreement rules may be attached to the order lines and then enforced throughout the rest of the process. Service level agreement rules may include minimum fill rates, partial commitment, cancelling of balances, etc. Furthermore, fulfillment includes rules that have been set up to automatically assign inventory using score, safety stock, percentage to fill, etc. The review process provides that the fulfillment plan can be reviewed and modified, as necessary (e.g., change fulfillment quantities, change source branch/plant, view item availability, etc).

Furthermore, release allows the system to move the order back into the sales order process (i.e., print pick slip), which validates that the order has been filled to the service level rules. Notification can be sent to a user-defined entity when the orders are released to alert the party that an order has not been completely fulfilled (i.e., via email, SMS texts, telephone, etc.).

Additionally, fulfillment tools allow customers to streamline and formalize manual processes for fulfillment of orders on a daily basis. The fulfillment scoring preference and service level rules such as order and line fill percentage, partials and cancel rules will greatly automate the execution of the customer order policies. Customers in the consumer products and the medical products industries will enjoy huge benefits from this new functionality. Fulfillment management will also allow customers to improve their customer satisfaction and reduce costs to service their customers (this can be used across multiple verticals). Further, fulfillment management is flexible enough to address fulfillment needs, including customer prioritization, order fill rates, shipping windows, and shipment frequency restrictions. The many levels of configuration that are possible through the workbench more precisely cater to customers' shipping requirements, and the visual overview of the processing that occurs clearly highlights exceptions which allows focus on the orders needing attention.

Figure 1B:
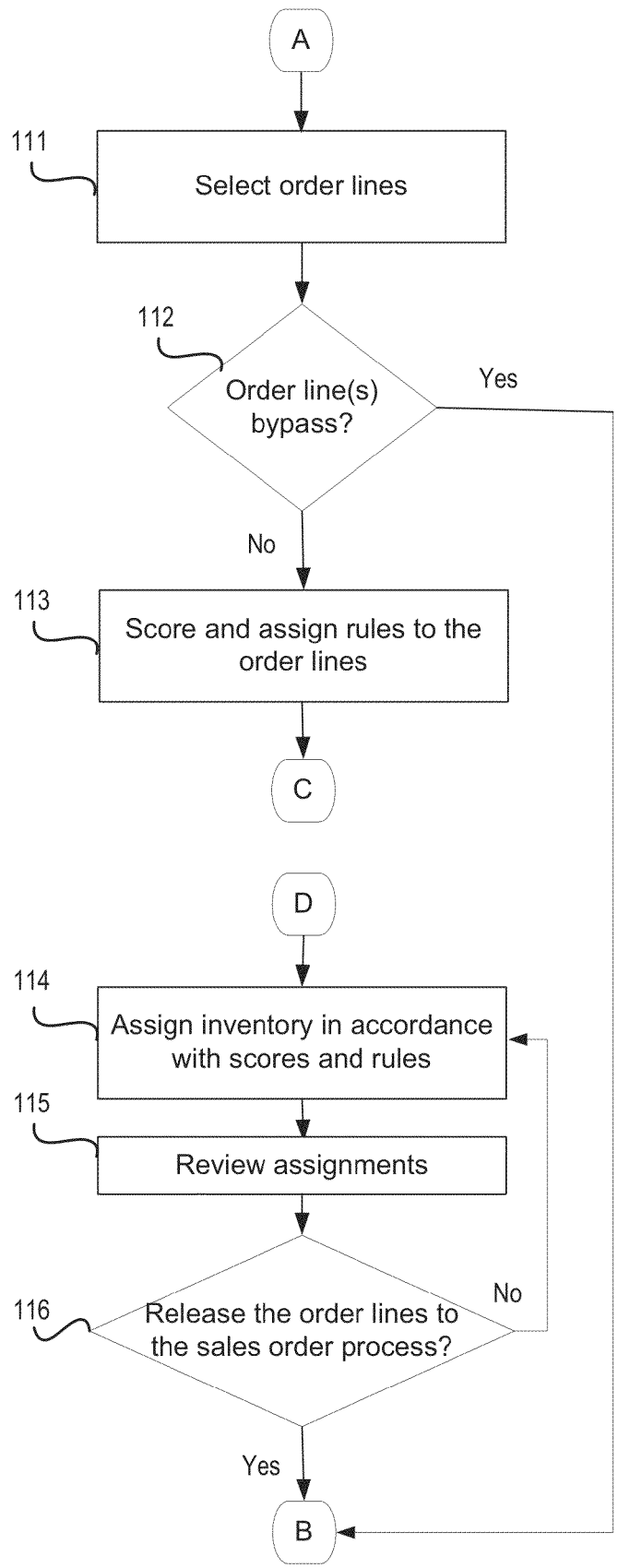
Figure 1C:
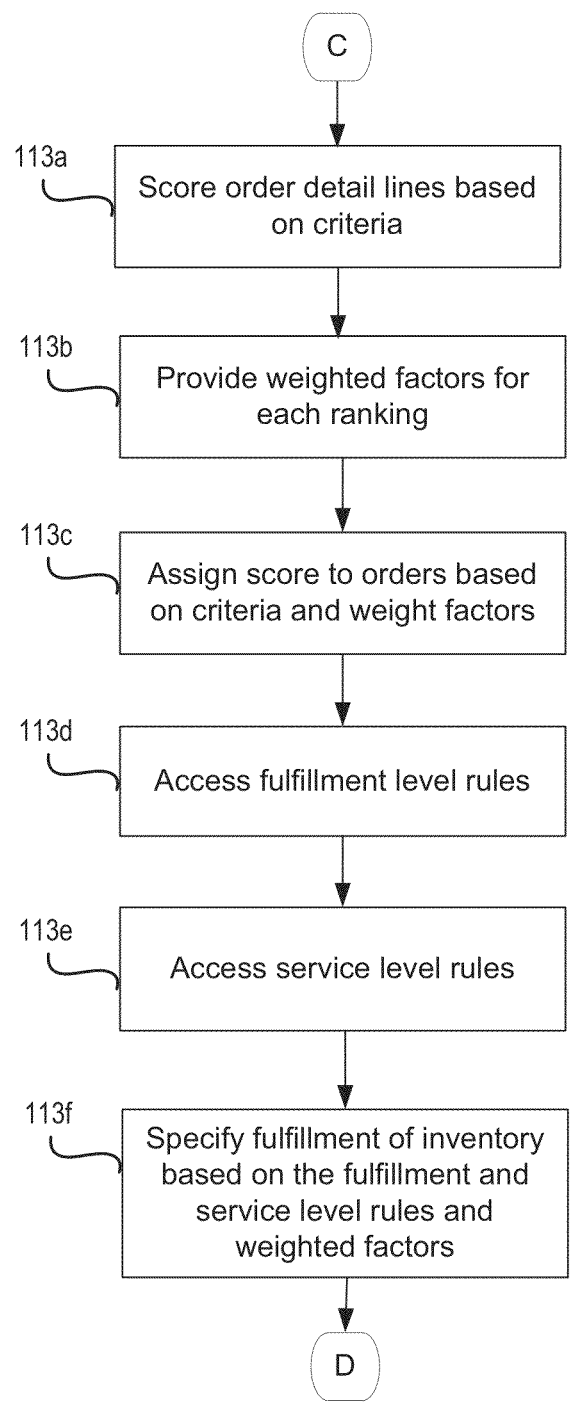

Turning now to FIGS. 1A-1C, methods of implementing fulfillment management are illustrated. At process block 105, order information is entered and received by the fulfillment processing system. In one embodiment, the order information may be entered via any one of SO entry, CSR SO entry, CSS, blanket orders, recurring orders, demand scheduling execution (DSE), electronic data interchange (EDI), transfer orders or the like. Furthermore, order entry may have customer preferences to customize order entry and order information.

At process block 110, the order may be fulfilled which continues from point A in FIG. 1A to point A in FIG. 1B. As such, at process block 111 in FIG. 1B, during the fulfillment process order lines are selected. One aspect of the present invention is the ability to select by individual order lines. A customer may need to only have a subset of the order lines processed through the fulfillment process and the remainder can be fulfilled immediately using, for example, the standard FIFO method. Furthermore, the ability to process lines individually allows for more efficient and more customized order fulfillment, which in turn increases productivity and client satisfaction.

In a further embodiment, order lines may be selected or categorized by order line attributes. For example, selection of order lines or groups of order lines may be based on customer (or customer group), item (or item group), document type, etc. Furthermore, customers may select preferences which automatically determine which order lines to select for the fulfillment process.

Another determination which may be made with regard to the selection process includes determining if the order type of an order line is a bypass order type (decision block 112). In one embodiment, a bypass order line type includes: manufactured-to-order, configured-to-order, non-stock items, designed-to-order, direct ship orders (from supplier directly to customer), etc. Accordingly, such orders which are considered bypass orders would be sent directly to print pick slips (process block 117). Otherwise, the method continues to process block 113, which includes scoring and assignment of service level agreement rules to the selected order lines.

Scoring continues from point C of FIG. 1B to point C of FIG. 1C, At process block 113a, each of the order lines is scored based on order criteria. In one embodiment, the order criteria may include order type, line type, requested date age, customer priority, quantity, etc. Further, any possible item, customer, or order line attribute may be used to score an order line.

At process block 113b, weighted factors may be applied to each attribute. For example, each attribute may be weighted between 0% and 100% with a total of all attributes to be 100%. As such, customer priority may be weighted at 80% and requested date age may be weighted at 20%. This allows for the flexibility of having one attribute that is more important than the others.

For example, order line 1 may have a date requested age of 25 days and a customer priority of 1, whereas order line 10 may have a date requested age of 45 days and a customer priority of 2. Assuming that customer priority is weighted higher than date requested age, order line 1 would be fulfilled before order line 2, even though order line 2 has been waiting longer. Accordingly, any order line attribute configuration and weighting may be used to rank order lines.

Hence, at process block 113c, scores may be assigned to orders based on criteria and weight factors. At process block 113d, fulfillment level rules may be accessed. In one embodiment, fulfillment level rules may be used to further define fulfillment priority of order lines. Furthermore, at process block 113e, the service level rules may be accessed. As previously discussed, service level rules may include the ability to specify the percent of an order or line that must be filled prior to releasing the order to the warehouse, as well as determining the number of times to release the line to the warehouse. Creation of rules at the sales order line level, at the order level, or both, may also be done. There is also flexibility on how the rule is set up; for example, if there is a formal service level rule for a customer or if there are internal service level goals for a branch/plant or items, such requirements may be accommodated.

Similar to scoring, if there are more complex service level rules, they can be created in a custom business function and then be called from the rules. Further, validation of lines and/or orders are filled to specific service levels, and validation of fill levels can be done prior to release from fulfillment. As such, a service level rule may be created with rules based on: customer, customer group, item, item group, branch/plant, effective dates, etc.

Therefore, at process block 113f, the fulfillment of the inventory may be specified for each order line based on the fulfillment and service level rules and the score of the line. Accordingly, the available inventory may be specified for fulfillment in the most optimal manner.

Continuing from point D in FIG. 1C to point D in FIG. 1B, at process block 114, the specified inventory may then be assigned in accordance with the scores and rules. In one embodiment, the assignment may be done in a batch format or interactively. In the interactive format, the customer has an opportunity to review the assignments (process block 115). During the review process, the customer can change the fulfilling branch/plant, change quantities, etc. Additionally, the customer can sort the assignments by order line score or other order line attributes. As discussed above, the higher the order line score, the more inventory will be assigned to that order; however, at times the assignment may need to be changed. As such, the orders may not be released until a release is authorized (decision block 116).

For example, some inventory may be held back (for some reason known to the sales manager or supply manager, or there may be level loading of inventory, safety stock hold back, etc.). Additionally, historical data may be used to anticipate supply needs, and hold backs for known likely new orders may be implemented to reserve stock for such future orders. Furthermore, each line may be processed until each line has been fulfilled, or until the available stock has been assigned.

Additionally, during the review process, flags and other notifications may be shown for orders which are unfulfilled, partially filled, overdue, etc. Also, sorting by problem lines may be applied. Any level of review may be presented for the customer to make judgment calls regarding allocation of inventory and the inventory itself.

The process continues from point B of FIG. 1B to point B of FIG. 1A. At process block 117, pick slips are printed, then the shipment of the orders may be confirmed (process block 118), and the invoices may be printed or generated (process block 119). Furthermore, at process block 120, sales information may be updated according to the fulfilled orders.

Figure 2:
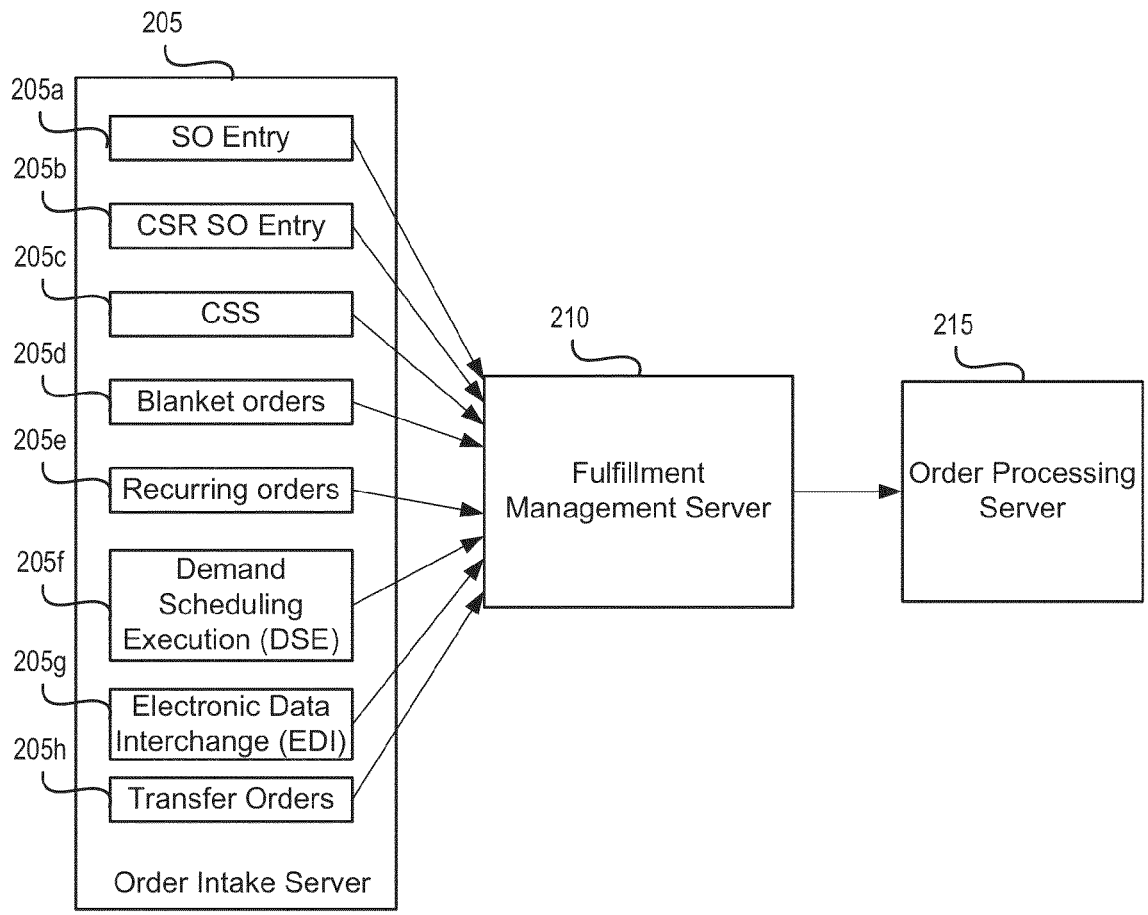
FIG. 2 is a block diagram illustrating a system for implementing fulfillment management, in accordance with various embodiments of the invention.

Referring next to FIG. 2, a system 200 for implementing fulfillment management systems is illustrated, in accordance with embodiments of the invention. In one embodiment, system 200 may include an order intake server 205 in communication with a fulfillment management server 210 and further in communication with an order processing server 215. In one embodiment, the order intake server 205 may include multiple intake options including: a SO entry 205a, a CSR SO entry 205b, a CSS 205c, blanket orders 205d, recurring orders 205e, demand scheduling execution (DSE) 205f, electronic data interchange (EDI) 205g, and transfer orders 205h. In one embodiment, each of the order lines may be received from one or more of the intake methods at the order intake server 205.

Further, the fulfillment management server 210 may receive the orders and process fulfillment according to embodiments of the present invention, for example, method 100 from FIGS. 1A-1C. Accordingly, at the order processing server 215, the fulfillment assignments made may be executed and ultimately processed for shipment.

Figure 3A:
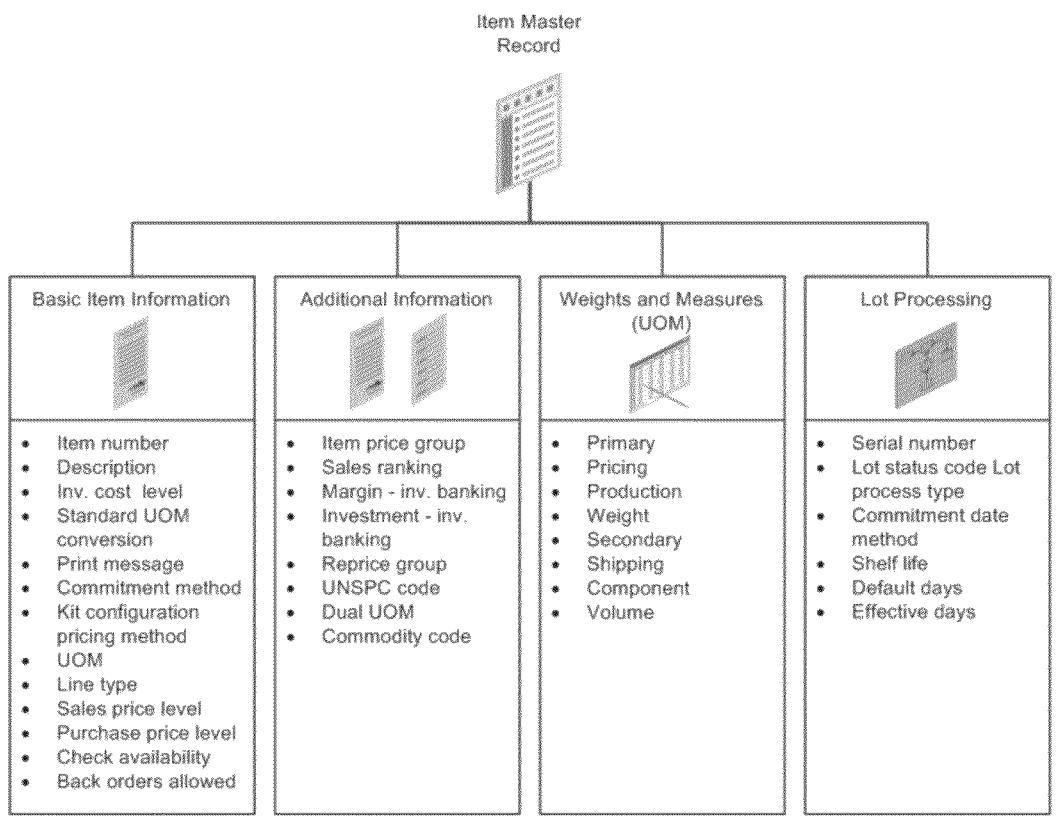
FIGS. 3A-3C are user interfaces illustrating interfaces for implementing fulfillment management, in accordance with various embodiments of the invention.
Figure 3B:
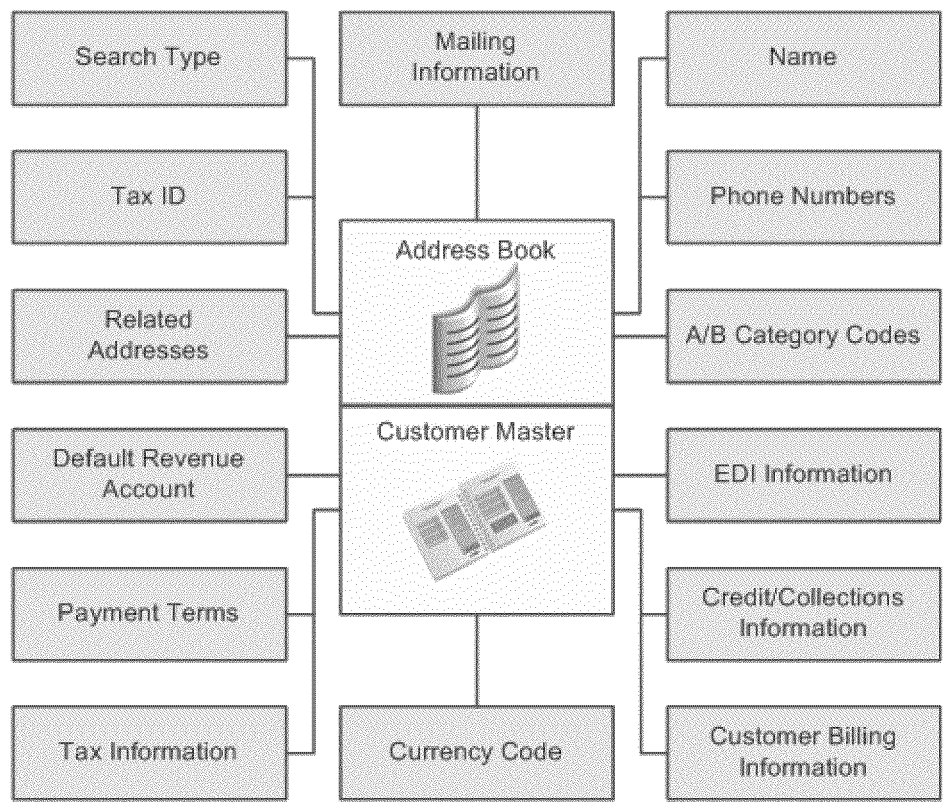
Figure 3C:
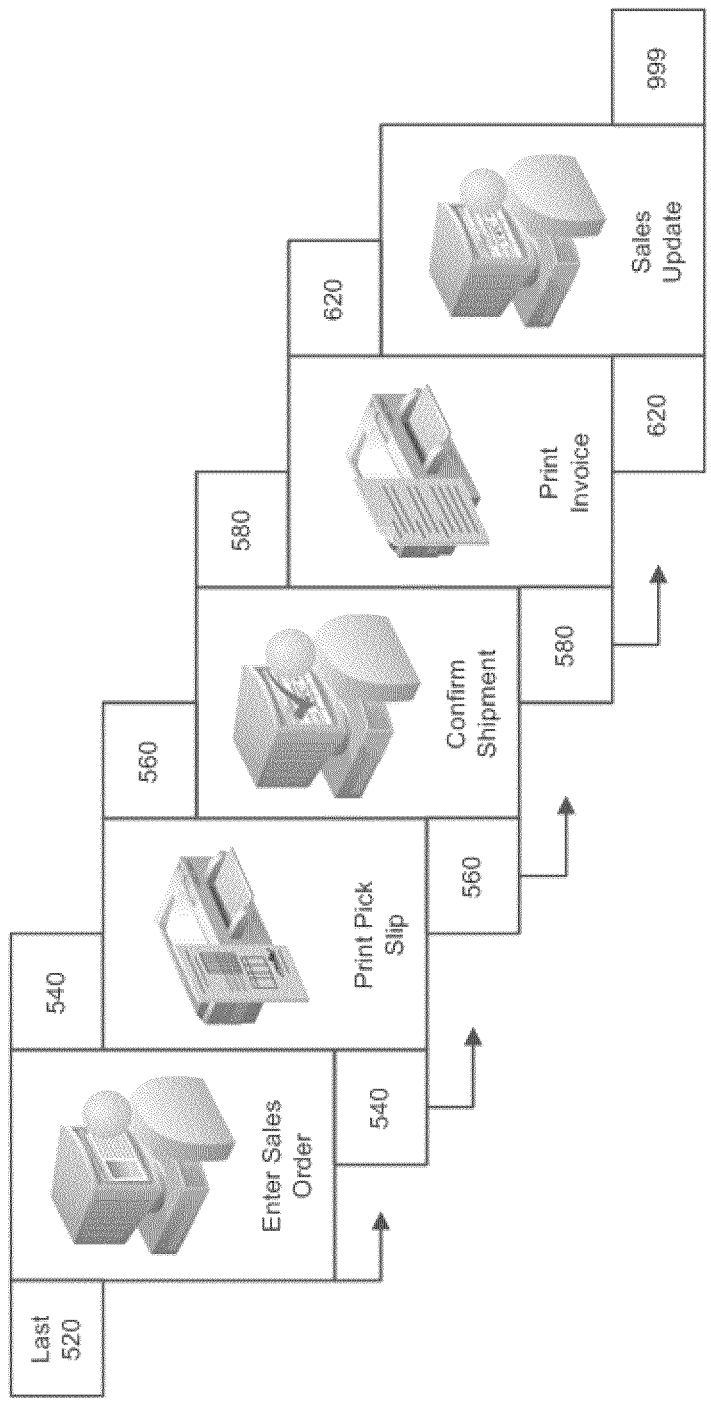

Turning now to FIGS. 3A-3C, aspects of implementing fulfillment management are illustrated, in accordance with various embodiments of the invention. FIG. 3A shows item records, for example, item master lists, item branch lists, item groups, etc. The item master record may include basic item information such as: item number, description, cost level, standard UOM conversion, print message, commitment method, kit configuration pricing method, UOM, line type, sales price level, purchase price level, check availability, back orders allowed, and the like. Additional information may include: item price group, sales ranking, margin and investment (for investment banking), reprice group, UNSPC code, dual UOM, commodity code, etc.

In one embodiment, the item master record may also include weights and measures for items. For example, the weights and measures may include: primary, pricing, production, weight, secondary, shipping, component, volume, etc. The item master record may also include lot processing information, for example, serial number, lot status code lot processing type, commitment date, shelf life, default days, effective date, etc.

Turning now to FIG. 3B, customer records, for example, address book, customer billing instructions, customer groups, etc. are shown. In one embodiment, the address book may include: search type, tax ID, related addresses, mailing information, customer name, telephone numbers, category codes, etc. Furthermore, the customer master record may include: default revenue account, payment terms, currency code, customer billing information, collections information, electronic data interchange (EDI) information, etc.

Referring next to FIG. 3C, order activity rules which include document type, line type combinations, status codes, etc. are shown. Order activity rules may enable a users to define the steps (or the flow) of sales orders through order processing. Furthermore, fulfillment provides, for example, additional visibility of the order status. For example, a new status code can be added between 520 and 540, such as 524 for "in fulfillment" indication.

Figure 4A:
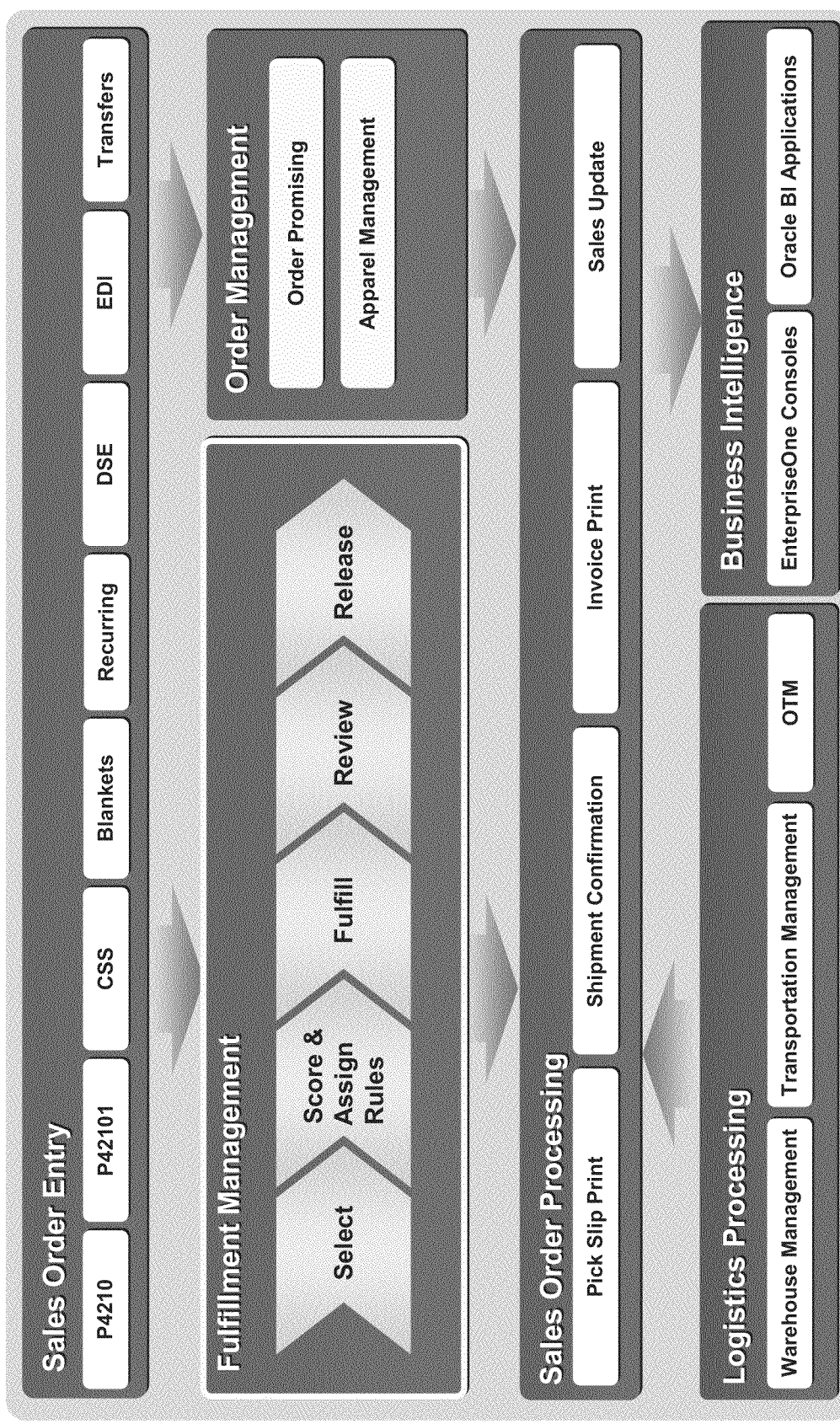
Figure 4B:
Figure 4C:
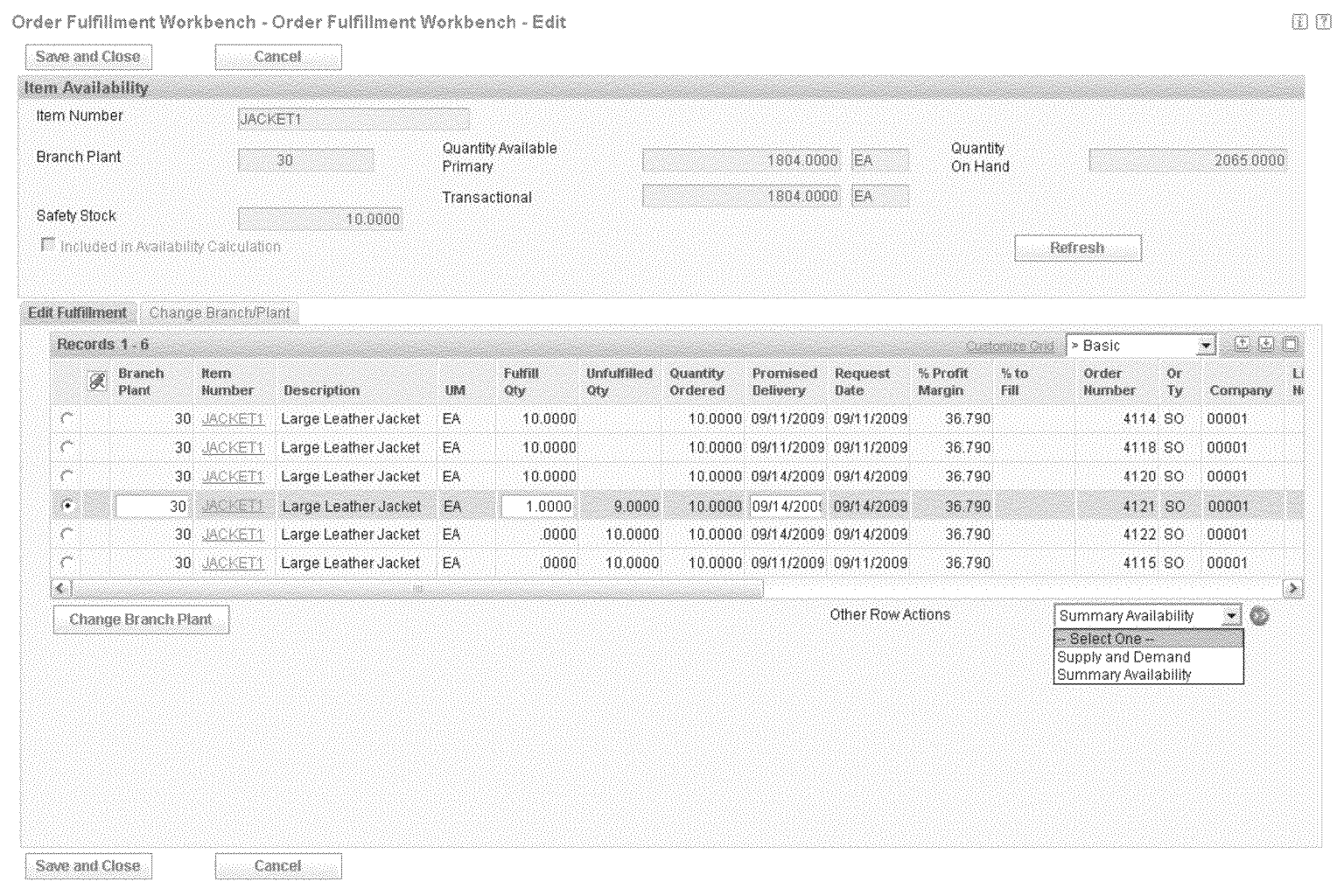

FIGS. 4A-4C illustrate interfaces and flow diagrams for implementing fulfillment management, in accordance with various embodiments of the invention. Turning now to FIG. 4A, various steps for sales order management are included. In one embodiment, the fulfillment process enable customers to determine how to fulfill (or assign) inventory to sales orders. The fulfillment management includes, for example, selecting of orders that are to enter the process, scoring the orders, fulfilling inventory to the orders, reviewing the fulfillments, and releasing the order back to the standards sales process. The selection process includes the ability to not have all orders or items enter the process and monitoring of the fulfillment of standard order quantities for specific items and control of demand by not always fulfilling 100% of all orders.

Additionally, orders can be entered from all forms of SOE, CSS, quotes, blanket orders, recurring orders generating sales orders, demand scheduling execution (DSE), inbound electronic data interchange (EDI), copy, transfer orders, etc. Further, from preferences set up by document type, not all order lines must be processed into the fulfillment process. For example, rush orders may not enter the process and get inventory allocated using current commitment processing. Also, not all items go into the fulfillment process—some items that are configured-to-order or make-to-order do not go through the fulfillment process.

Scoring and assigning rules provides that during order entry scoring and assignment of rules can be completed interactively; alternatively, this can be done using batch programs to reduce the performance impact during order entry. Specifically, scoring uses information from the order and the customer to score order lines (e.g., customer priority, order type, line type, requested date age, etc.). In one embodiment, there are two scoring methodologies: basic scoring and advanced scoring.

Figure 5A:
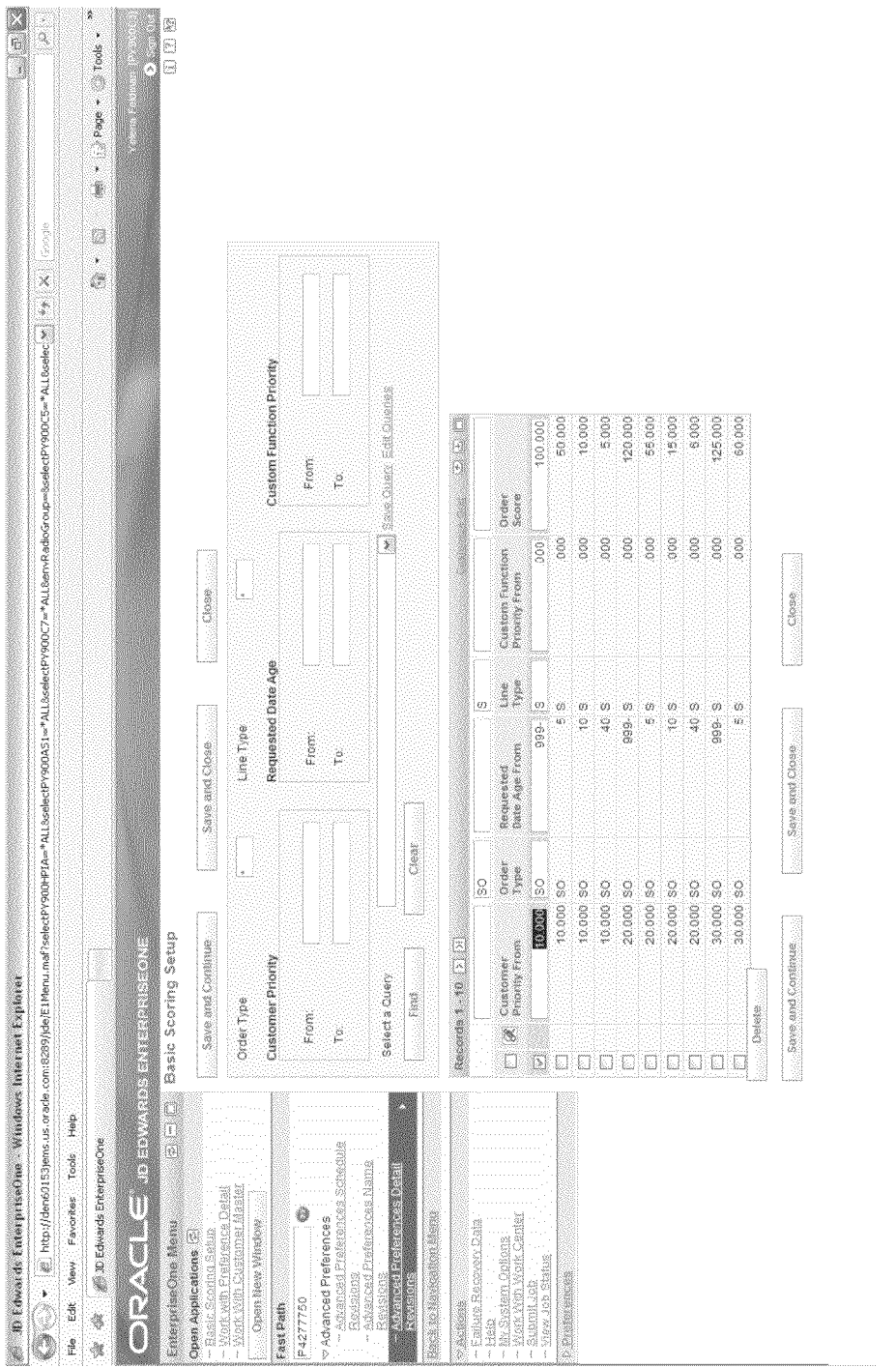

Referring to FIGS. 5A and 5B, for the basic score assignment a grid may be used to input the assigned score value with limited calculations. For example, a criteria may be entered and then a final score is specified. Referring to FIGS. 5C and 5D, the advanced score assignment may use multiple preferences for order type, line type, requested date age, etc., and also customer priority. The weighted average of the above criteria is then assigned to each attribute. For example, the requested date age may be set up by a range of days (i.e., the date is in the next 2 days, from 2-5 days out, etc.). The advanced scoring calculates the score based on the criteria and weight for each of the criteria.

Fulfillment rules use the score to determine how much to fulfill for an order. In one example, the lower the score the higher the priority. As such, if the score is 0-4.9 and anything is available, the line should be 100% fulfilled, if the score is 5-9.9 and at least 50% of safety stock is available, then the line should be 100% fulfilled. Further, if the score is 10-24.9 and at least 75% of safety stock is available, the line should be 80% fulfilled, and if the score is over 25 and at least 100% of safety stock is available, the line should be 75% fulfilled. Accordingly, even if the full order quantity is available, the system will only fulfill 75% of the order quantity to ensure that inventory is available for other orders. Additionally, if the score is 30 because the order is 2 weeks out, the system may partially assign inventory (75% of order quantity), and then as the requested date gets closer, a re-score of orders may re-assign a score of, for example, 3, at which the system will then assign 100% of the order quantity.

Additionally, service level rules may be applied when orders are created. In one embodiment, scoring and service level rules may run as separate parts of form fulfillment, and may not be required for customers to use both. Furthermore, service level rules and scoring may can take place at the same time, and may not be dependant on each other. For example, service level rules enable a customer to specify the percent of an order or line that must be filled prior to releasing the order to the warehouse, as well as determining the number of times desired to release the line to the warehouse. Creating rules can be done at the sales order line level, at the order level, or both (there is flexibility on how the rules are set up). If the customer has formal service level rules or if there are internal service level goals for a branch/plant or items, service level rules can be set accordingly. Similar to scoring, if the customer has more complex rules, the customer can create a custom business function and call it from the rules.

Additionally, service level rules may be used to validate order lines and ensure that orders are filled to specific service levels, as well as validate fill levels prior to release from fulfillment. Creation of rules may be based on, for example, the customer, the customer group, the item(s), the item group, branch/plant, etc. Essentially, any criteria which can distinguish one order from another can be used to base a service level rule. For example, the most important client's items may always be fulfilled regardless of the urgency of other customer's order lines. Further, an optional call to custom business functions for unique or highly complex service level rules may be implemented.

Specifically, line fill percentage compares the order quantity and the allocated quantity to the service level fill percent, in order to ensure proper quantities are fulfilled. Order fill percentage by line count can be used in conjunction with the line fill percentage, such that comparison can be made of the number of lines that meet the line fill requirements to the total number of lines on the order. Further, specifying whether to commit partial quantities if the service level fill percent is not met is also available.

One example of service level rules at the line level may include: order qty=10, allocated qty=8, 8/10=80% filled, line level fill percent=90%. In this situation, the fill percent is not met, whereas, in the following order, the order has 10 lines, 8 lines meet their line fill level of 90%, 8/10=80% of the order is filled, order level fill percent=80%. In this situation, the order fill rate is met because 8 of the 10 lines met the line level fill requirements of 90%. Also, service level rules enable the customer to determine whether to cancel the open balance of an order line, for example, when there is a fill of 98% of a line, the rule can be set to cancel the open 2%, etc.

Once the scoring and service level rules have been assigned and applied, the assignment of inventory can commence. Assignment provides for the system to assign (or allocate, fulfill, etc.) inventory to open sales order lines. In one embodiment, there are two options to assign inventory to open sales order lines: batch fulfillment to create a system-generated fulfillment plan, or an interactive workbench to manually assign inventory to lines, as found in FIGS. 4B and 4C.

In one embodiment, the batch fulfillment assigns inventory to order lines based on, for example, data selection, sort sequence (i.e., score, date, etc.), fulfillment rules, service level rules and the like. Furthermore, evaluation and optionally re-evaluation of order lines multiple times before the inventory are assigned (i.e., to run "what-if" scenarios), is possible. Further, the batch may be run in proof mode to review information and then run in final mode to see the results in, for example, a workbench or other UI interface. In one embodiment, this batch process may create a PDF (or similar document) that displays order information, quantity information, etc.

In certain circumstances the customer may desire to re-run the orders that already had inventory allocated. For example, orders may be received overnight via electronic data interchange (EDI), and at 7 am the batch is run to allocate inventory, and then at 8 am, the highest priority client calls with an urgent request for an item. At that point a re-run of the batch after the order is entered may be executed in order to capture the new demand and re-allocate inventory. Essentially, the system will un-assign the previous run and step through the fulfillment process again.

Referring to FIG. 4C, a review process performed at a workbench that may be provided to modify the inventory assignments created by the batch program is illustrated. In one embodiment, an interactive workbench provides a view of the results of the batch fulfillment and exception monitoring for order lines that could not be filled. The workbench further provides the ability to make changes to the quantity to fill, the promised delivery date, the branch/plant, etc. Furthermore, search field values can be populated with default processing options, and when the user enters the workbench they are able to determine whether to monitor exceptions (i.e., filter) by customer, item, look at all sales order lines, etc.

The release step of the fulfillment process allows the customer to validate and release the inventory assignments (e.g., batch fulfillment, interactive workbench, batch release, etc. (orders lines are in fulfillment until they are released). Hence, when the plan is released, the system may be configured to return order lines to the next step in the sales order process (i.e., print pick slips), split order lines if the order quantity is partially fulfilled, cancel the open balance if specified in service level rules, and send a notification to a user-defined party if an order is not fully filled. If a line is not filled at all or partially filled, an email notification may be sent to a customer service representative, or similar individual. One example of such a notification may give basic information about the line (e.g., customer, quantity ordered, released, filled, unfilled, etc.). Furthermore, the notification may indicate that the line was not released because the line did not meet the 90% fill percent, and the person being notified could proactively call the customer and discuss options. In certain situations it may be decided that it is best to override the fill percent and force the order through with the inventory that is available or wait until more inventory is available to fill the line. Such tracking and notification enables a representative to proactively discuss with the client instead of reactively discussing after the order is already late.

As such, the final step of the fulfillment management process is the release step which is how order lines are moved back into the sales order processes, where pick slip would be printed, ship confirmation, etc. Accordingly, once the release batch is run, the system validates that the service level rules have been met and releases the order lines from the fulfillment management system.

Referring next to FIG. 4B, a fulfillment management user interface browse form is shown. In this example, the view of unfilled orders is sorted by item. This user interface shows an inquiry on item number=Jacket*, then, Jacket2 has been selected to view the associated sales order for the item. Again, the order number may be highlighted to indicate an issue with either the unfilled quantity or the promised delivery date. When inquiry by item is performed, the system may also display a chart. This chart may represent a visual representation of available versus unfilled inventory, safety stock, and quantities on order. There may be, for example, 4 chart types that have been defined. These, in this example, indicate the difference between available inventory, on order inventory, safety stock inventory, and unfilled orders. In one embodiment, if the user hovers over the bars on the charts, the system displays the quantities.

FIGS. 5A-5E are user interfaces and charts illustrating aspects of fulfillment management, in accordance with various embodiments of the invention. FIG. 5A shows a user interface for setting up basic scoring. In this view of Customer 55330 there is a priority of 10 in the Customer Billing Instructions and an order entered on Jun. 11, 2010 with a requested date of Jun. 11, 2010 which would be 18 days past its requested date. As such, this would receive a score of 100 which corresponds to the first line highlighted as it has a Customer Priority of 10 and is between −999 and 5 days of its requested date. Accordingly, this interface may be used to manipulate the basic scoring options.

Referring now to FIG. 5B, which illustrates an example of a basic score search sequence as related to FIG. 5A. For this example, the higher the score, the higher the priority. Before the system can select a score, it may reorder the data (i.e., not necessarily how it shows on the form): Order Type=Ascending, Line Type=Ascending, Customer Priority=Descending, Requested Date Age=Descending, and Custom Function Priority=Descending. The system may then start the record selection.

In this example, the Order Type is equal to the sales order document type, the Line Type is equal to sales order detail line type, and the Customer Priority value is less than or equal to the special handling code for the priority processing value assigned to the sales order line. The Requested Date Age is less than or equal to the difference between the request date on the sales order line and today's date. The Custom Function Priority is less than or equal to the value returned from the custom function specified in the Scoring batch processing options. In this example, the scoring is not using a custom program, so all values are the same.

Then, a selection of the first record is made because it most closely matches the order information. If the system does not find a score, it will assign a zero (therefore, the order lines that may not need to be scored will get the highest priority score (because low score=high priority). In one embodiment, the system may use zero as a default value for the score. Hence, if low score=high priority, zero may be a valid score for order lines.

Turning now to FIG. 5C, a user interface for utilizing advanced scoring is shown. In one embodiment, the weights for each priority may be defined. Then, each priority may be multiplied by adjusting the respective weight and then summed together to produce the total score.

Turning to FIG. 5E, a user interface for manipulating processing options is shown for the fulfillment batch. These options may include: proof or final mode (which in this case is defaulted to final mode), and fulfillment plan description. Additionally, an option for including backordered quantity as available quantity, may be included. This option may be set to either not add backordered quantity to available quantity or to add backordered quantity to available quantity.

Furthermore, the interface may provide the option of automatically releasing the order from fulfillment after orders are fulfilled. Also, the fulfillment rule name, a reprocess fulfillment option, a record reservation, and an override advanced preference option may be included. Each of these options may provide the customer with fulfillment flexibility.

Turning now to FIG. 5D, an advanced scoring table is shown. In the advanced scoring, the calculations may be performed on weighted attributes and criteria in order to provide a more robust scoring for each of the order lines within the order. As such, FIG. 5D illustrates some categories and weighting associated with the categories which may be used to provide an advanced scoring calculation.

Figure 6:
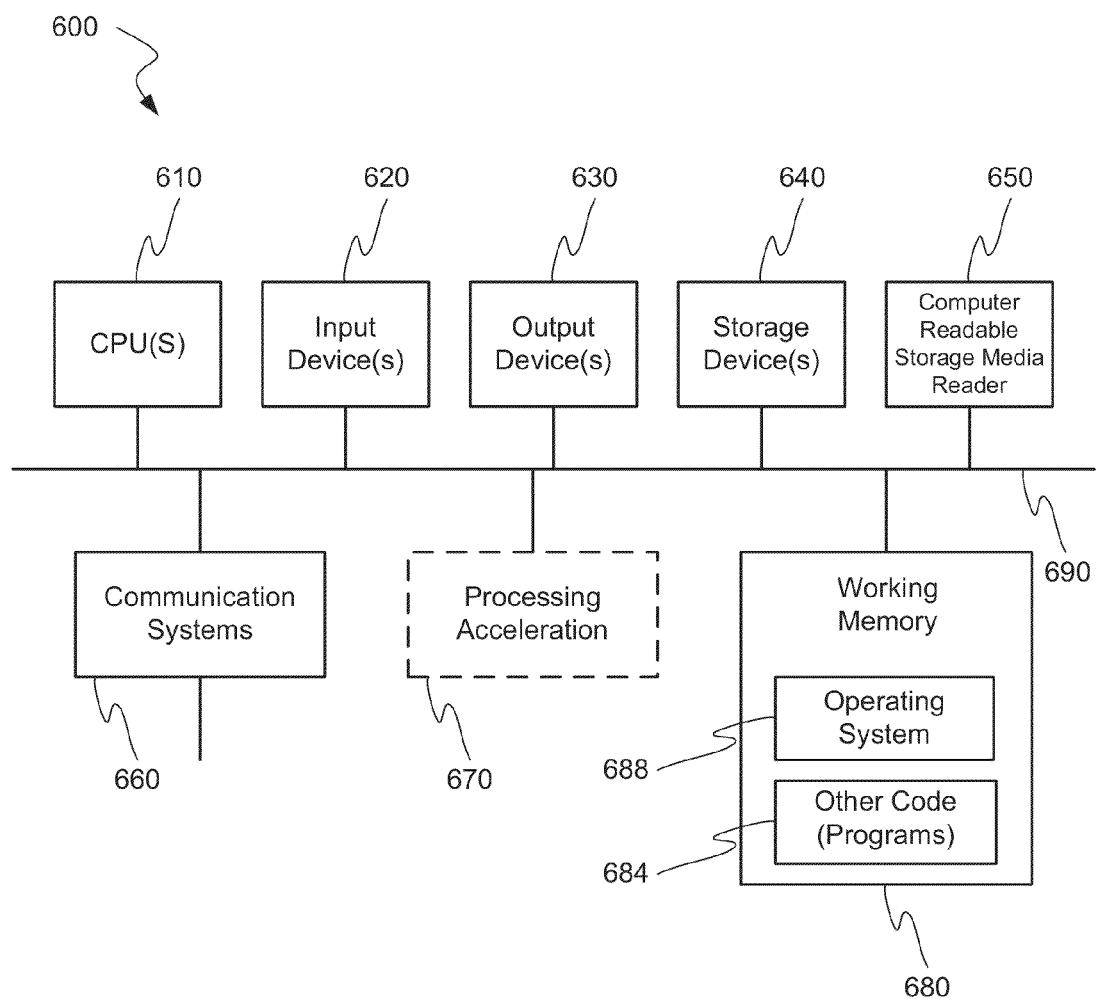
FIG. 6 is a generalized schematic diagram illustrating a computer system, in accordance with various embodiments of the invention.

FIG. 6 is a block diagram illustrating an exemplary computer system 600 in which embodiments of the present invention may be implemented. The computer system 600 is shown comprising hardware elements that may be electrically coupled via a bus 690. The hardware elements may include one or more central processing units 610, one or more input device(s) 620 (e.g., a mouse, a keyboard, etc.), and one or more output device(s) 630 (e.g., a display device, a printer, etc.). The computer system 600 may also include one or more storage device(s) 640. By way of example, storage device(s) 640 may be disk drives, optical storage devices, a solid-state storage device such as a random access memory ("RAM") and/or a read-only memory ("ROM"), which can be programmable, flash-updateable and/or the like.

The computer system 600 may additionally include a computer-readable storage media reader 650, a communications system 660 (e.g., a modem, a network card (wireless or wired), an infra-red communication device, Bluetooth™ device, cellular communication device, etc.), and working memory 680, which may include RAM and ROM devices as described above. In some embodiments, the computer system 600 may also include a processing acceleration unit 670, which can include a digital signal processor, a special-purpose processor and/or the like.

The computer-readable storage media reader 650 can further be connected to a computer-readable storage medium, together (and, optionally, in combination with storage device (s) 640) comprehensively representing remote, local, fixed, and/or removable storage devices plus storage media for temporarily and/or more permanently containing computer-readable information. The communications system 660 may permit data to be exchanged with a network, system, computer and/or other component described above.

The computer system 600 may also comprise software elements, shown as being currently located within a working memory 680, including an operating system 688 and/or other code 684. It should be appreciated that alternate embodiments of a computer system 600 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 600 may include code 684 for implementing any or all of the functions of the various elements of the architecture as described herein. For example, software, stored on and/or executed by a computer system such as system 600, can provide the functionality and/or other components of the invention such as those discussed above. Methods implementable by software on some of these components have been discussed above in more detail.

Figure 7:
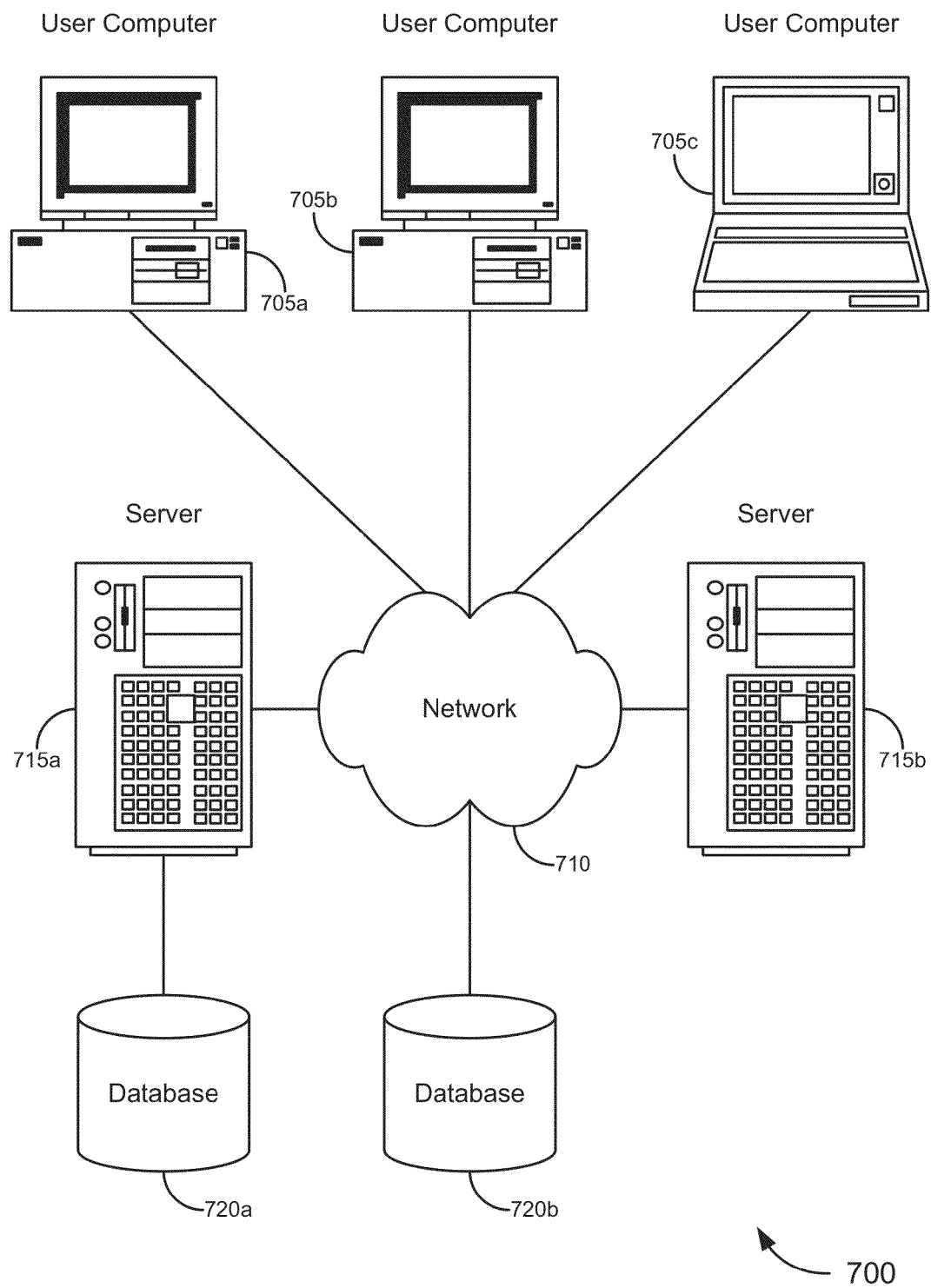
FIG. 7 is a block diagram illustrating a networked system of computers, which can be used in accordance with various embodiments of the invention.
Figure 2:
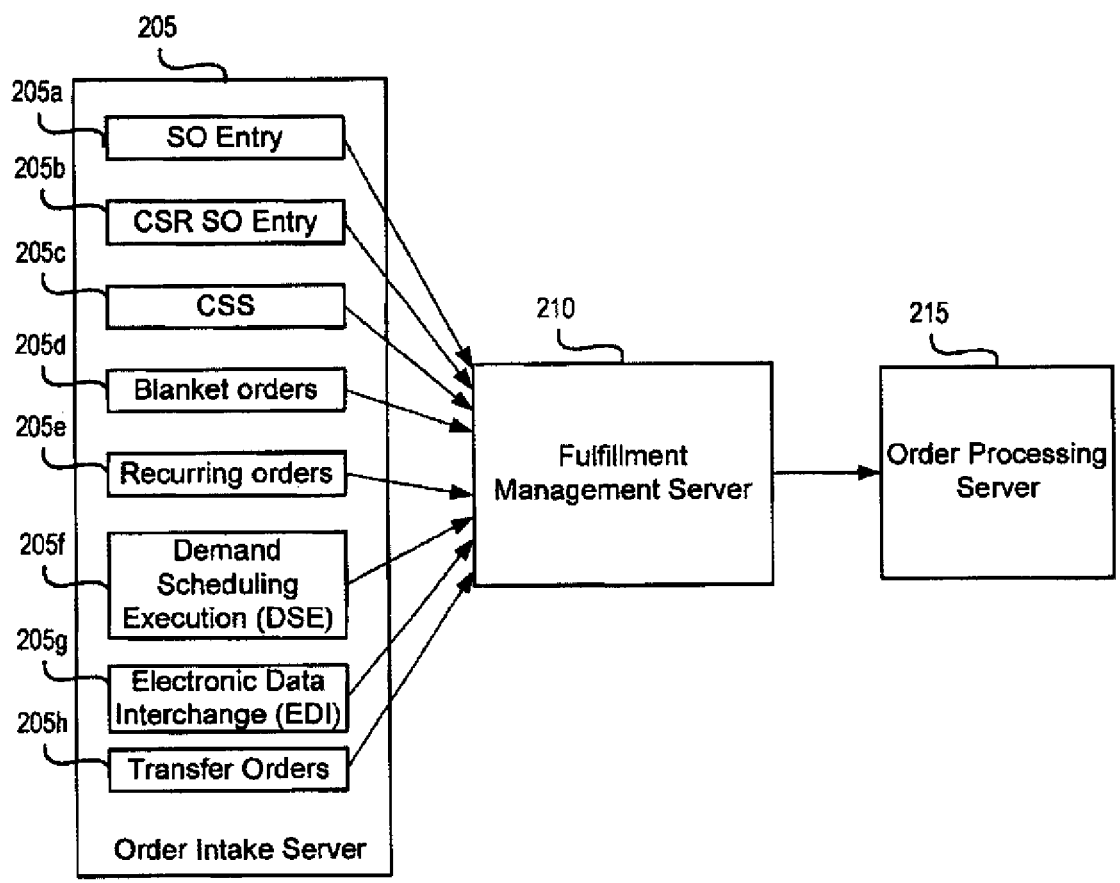

Merely by way of example, FIG. 7 illustrates a schematic diagram of a system 700 that can be used in accordance with one set of embodiments. The system 700 can include one or more user computers 705. The user computers 705 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 705 can also have any of a variety of applications, including one or more applications configured to perform methods of the invention, as well as one or more office applications, database client and/or server applications, and web browser applications. Alternatively, the user computers 705 can be any other electronic device, such as a thin-client computer, Internet-enabled mobile telephone, and/or personal digital assistant (PDA), capable of communicating via a network (e.g., the network 710 described below) and/or displaying and navigating web pages or other types of electronic documents. Although the exemplary system 700 is shown with three user computers 705, any number of user computers can be supported.

Certain embodiments of the invention operate in a networked environment, which can include a network 710. The network 710 can be any type of network familiar to those skilled in the art that can support data communications using any of a variety of commercially available protocols, including without limitation TCP/IP, SNA, IPX, AppleTalk, and the like. Merely by way of example, the network 710 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 715. Each of the server computers 715 may be configured with an operating system, including without limitation any of those discussed above, as well as any commercially (or freely) available server operating systems. Each of the servers 715 may also be running one or more applications, which can be configured to provide services to one or more user computers 705 and/or other server computers 715.

Merely by way of example, one of the server computers 715 may be a web server, which can be used, merely by way of example, to process requests for web pages or other electronic documents from user computers 705. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 705 to perform methods of the invention.

The server computers 715, in some embodiments, might include one or more application servers, which can include one or more applications accessible by a client running on one or more of the user computers 705 and/or other server computers 715. Merely by way of example, the server computers 715 can be one or more general purpose computers capable of executing programs or scripts in response to the user computers 705 and/or other server computers 715, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 705 and/or another server computer 715. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 705 via a web server (as described above, for example). Similarly, a web server might receive web page requests and/or input data from a user computer 705 and/or forward the web page requests and/or input data to an application server. In some cases a web server may be integrated with an application server.

In accordance with further embodiments, one or more server computers 715 can function as a file server and/or can include one or more of the files (e.g., application code, data files, etc.) necessary to implement methods of the invention incorporated by an application running on a user computer 705 and/or another server computer 715. Alternatively, as those skilled in the art will appreciate, a file server can include all necessary files, allowing such an application to be invoked remotely by a user computer 705 and/or server computer 715. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more database(s) 720. The location of the database(s) 720 is discretionary. Merely by way of example, a database 720a might reside on a storage medium local to (and/or resident in) a server computer 715a (and/or a user computer 705). Alternatively, a database 720b can be remote from any or all of the computers 705, 715, so long as the database can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle™ database, that is adapted to store, update, and retrieve data in response to SQL-formatted commands. The database might be controlled and/or maintained by a database server, as described above, for example.

The invention has now been described in detail for the purposes of clarity and understanding. However, it will be appreciated that certain changes and modifications may be practiced within the scope of the appended claims.

What is claimed is:

1. A method of implementing fulfillment management, the method comprising:

receiving a sales order, wherein the sales order includes a plurality of order lines;

determining that at least one of the plurality of order lines includes bypass order content and two or more of the plurality of order lines does not include bypass order content;

assigning inventory for the at least one of the plurality of order lines that includes bypass content based on a First In First Out (FIFO) method;

scoring each of the two or more of the plurality of order lines that does not include bypass content individually, wherein the scoring comprises weighting order line attributes and wherein the order line attributes include one or more of order type, line type, requested date age, or customer priority;

accessing one or more rules defining a service level agreement applicable to the sales order, wherein the rules comprise definition of one or more of partial quantity agreements, minimum quantity thresholds, order line fill percentages, and minimum release amounts;

assigning the one or more rules to each of the two or more of the plurality of order lines that does not include bypass content individually;

based on the assigned rules, defining a priority rank of each of the two or more of the plurality of order lines that does not include bypass content;

specifying fulfillment of inventory to the sales order based on the priority rank and scoring of each of the two or more of the plurality of order lines that does not include bypass content; and assigning inventory to one or more of the two or more of the plurality of order lines that does not include bypass content based on the specified fulfillment.

2. The method of implementing fulfillment management as in claim 1, wherein the bypass order content includes one or more of: manufactured-to-order, configured to order, non-stock item, or direct ship order.

3. The method of implementing fulfillment management as in claim 1, wherein the defining of the priority rank of each of the two or more of the plurality of order lines that do not include bypass content comprises providing weighting of the order line attributes.

4. The method of implementing fulfillment management as in claim 1, further comprising providing a user interface for providing review of the assigned inventory, wherein the user interface at least includes quantity assignments for each of the order lines.

5. The method of implementing fulfillment management as in claim 1, further comprising checking each of the order lines against preferences to determine which of the order lines include bypass content and which order lines do not include bypass content.

6. The method of claim 1, wherein assigning inventory to one or more of the two or more of the plurality of order lines that does not include bypass content based on the specified fulfillment comprises assigning inventory to less than all of the two or more of the plurality of order lines that does not include bypass content.

7. A system for implementing fulfillment management, the system comprising:

a fulfillment management server including:

a memory device; and a processor in communication with the memory device, wherein the memory device has sets of instructions stored thereon which, when executed by the processor, cause the processor to:

receive a sales order, wherein the sales order includes a plurality of order lines;

determine that at least one of the plurality of order lines includes bypass order content and two or more of the plurality of order lines does not include bypass order content;

assign inventory for the at least one of the plurality of order lines that includes bypass content based on a First In First Out (FIFO) method;

score each of the two or more of the plurality of order lines that does not include bypass content individually, wherein the scoring comprises weighting order line attributes and wherein the order line attributes include one or more of order type, line type, requested date age, or customer priority;

access one or more rules defining a service level agreement applicable to the sales order, wherein the rules comprise definition of one or more of partial quantity agreements, minimum quantity thresholds, order line fill percentages, and minimum release amounts;

assign the one or more rules to each of the two or more of the plurality of order lines that does not include bypass content individually;

based on the assigned rules, define a priority rank of each of the two or more of the plurality of order lines that does not include bypass content;

specify fulfillment of inventory to the sales order based on the priority rank and scoring of each of the two or more of the plurality of order lines that does not include bypass content; and assign inventory to one or more of the two or more of the plurality of order lines that does not include bypass content based on the specified fulfillment.

8. The system for implementing fulfillment management as in claim 7, further comprising an order intake server in communication with the fulfillment management server, wherein the order intake server is configured to receive the sales order.

9. The system for implementing fulfillment management as in claim 8, wherein the sales order is received from one or more of: SO entry, CSR SO entry, CSS, blanket orders, recurring orders, demand scheduling execution (DSE), electronic data interchange (EDI), or transfer orders.

10. A computer-readable memory having sets of instructions stored thereon which, when executed by a computer, cause the computer to:

receive a sales order, wherein the sales order includes a plurality of order lines;

determine that at least one of the plurality of order lines includes bypass order content and two or more of the plurality of order lines does not include bypass order content;

assign inventory for the at least one of the plurality of order lines that includes bypass content based on a First In First Out (FIFO) method;

score each of the two or more of the plurality of order lines that does not include bypass content individually, wherein the scoring comprises weighting order line attributes and wherein the order line attributes include one or more of order type, line type, requested date age, or customer priority;

access one or more rules defining a service level agreement applicable to the sales order, wherein the rules comprise definition of one or more of partial quantity agreements, minimum quantity thresholds, order line fill percentages, and minimum release amounts;

assign the one or more rules to each of the two or more of the plurality of order lines that does not include bypass content individually;

based on the assigned rules, define a priority rank of each of the two or more of the plurality of order lines that does not include bypass content;

specify fulfillment of inventory to the sales order based on the priority rank and scoring of each of the two or more of the plurality of order lines that does not include bypass content; and assign inventory to one or more of the two or more of the plurality of order lines that does not include bypass content based on the specified fulfillment.

11. The computer-readable memory as in claim 10, wherein the bypass order content includes one or more of: manufactured-to-order, configured to order, non-stock item, or direct ship order.

* * * * *

UNITED STATES PATENT AND TRADEMARK OFFICE
CERTIFICATE OF CORRECTION

Page 1 of 2

PATENT NO. : 8,838,612 B2
APPLICATION NO. : 13/213411
DATED : September 16, 2014
INVENTOR(S) : Berlener et al.

It is certified that error appears in the above-identified patent and that said Letters Patent is hereby corrected as shown below:

In the Drawings

Delete drawing sheet 4 of 17, and replace with new drawing sheet. (See attached)

On sheet 14 of 17, in figure 5D, line 1, delete "Custom" and insert -- Customer --, therefor.

On sheet 14 of 17, in figure 5D, line 1, delete "Custom" and insert -- Customer --, therefor.

On sheet 14 of 17, in figure 5D, line 9, delete "Custom" and insert -- Customer --, therefor.

Signed and Sealed this
Seventeenth Day of March, 2015

Michelle K. Lee
*Director of the United States Patent and Trademark Office*